(12) United States Patent
Mittler et al.

(10) Patent No.: US 10,495,225 B2
(45) Date of Patent: Dec. 3, 2019

(54) COMPRESSION PISTON RING WITH PROFILED SECTION

(71) Applicant: FEDERAL-MOGUL BURSCHEID GMBH, Burscheid (DE)

(72) Inventors: Richard Mittler, Burscheid (DE); Peter Esser, Kurten (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 20 days.

(21) Appl. No.: 15/744,247

(22) PCT Filed: Jun. 2, 2016

(86) PCT No.: PCT/EP2016/062474
§ 371 (c)(1),
(2) Date: Jan. 12, 2018

(87) PCT Pub. No.: WO2017/008948
PCT Pub. Date: Jan. 19, 2017

(65) Prior Publication Data
US 2018/0209539 A1    Jul. 26, 2018

(30) Foreign Application Priority Data
Jul. 13, 2015   (DE) .......................... 10 2015 111 306

(51) Int. Cl.
*F16J 9/00*     (2006.01)
*F16J 9/20*     (2006.01)

(52) U.S. Cl.
CPC ...................................... *F16J 9/20* (2013.01)

(58) Field of Classification Search
CPC ..................... F16J 9/00; F16J 9/12; F16J 9/20
See application file for complete search history.

(56) References Cited

U.S. PATENT DOCUMENTS

| 1,585,422 A | 5/1926 | Selfert |
| 2,554,289 A | 5/1951 | Anderson |
| 2,912,292 A * | 11/1959 | Lawitschka ................. F16J 9/20 277/444 |
| 8,770,590 B2 * | 7/2014 | Esser ........................ F16J 9/203 123/193.6 |
| 10,052,748 B2 * | 8/2018 | Escolle .................... B25D 9/12 |

(Continued)

FOREIGN PATENT DOCUMENTS

| DE | 44 29 649 A1 | 2/1996 |
| DE | 10 2009 036240 A1 | 2/2011 |

(Continued)

*Primary Examiner* — Gilbert Y Lee
(74) *Attorney, Agent, or Firm* — Robert L. Stearns; Dickinson Wright, PLLC

(57) ABSTRACT

A compression piston ring 2 having a running-surface region 4, an upper flank 6, a lower flank 8 and also an inner circumferential surface 10, wherein the running-surface region 4 is provided with a profiled section, which, as viewed over the axial height of the running-surface region 4, comprises mutually spaced, convexly spherically constructed sections 12, 14 having an upper and lower apex So; Su, wherein a groove 16 with a depth Tn is arranged between the apexes So, Su, wherein both apexes So; Su are arranged below a centre M of the piston ring 2 in the axial direction.

10 Claims, 6 Drawing Sheets

(56) References Cited

U.S. PATENT DOCUMENTS

2006/0102131 A1* 5/2006 Han .......................... F16J 9/12
                     123/193.4
2015/0251304 A1* 9/2015 Escolle ................... B25D 9/12
                     173/206

FOREIGN PATENT DOCUMENTS

JP     H09 4711 A    1/1997
JP     2009-30558    7/2007

\* cited by examiner

COMPRESSION PISTON RING WITH PROFILED SECTION

BACKGROUND

1. Technical Field

The present invention relates to a compression piston ring having a running-surface region, which has a profiled section with two apexes below a centre of a height of the piston ring.

2. Related Art

Piston rings, and compression piston rings in particular, are usually used both in the first (uppermost) and in the second (central) piston ring groove of internal combustion engines. Here, the function of the compression ring is described by the following characteristics:
1. Sealing the crankcase against combustion gases.
2. Stripping excess lubricating oil, so that as little as possible thereof remains on the inner cylinder wall and can be combusted.

Rings with a spherical design of the running surface are used for this purpose. A large part of the gas streams or flows off, in the case of a compression ring, not only through the gap, but rather, depending on the wall thickness and diameter, over the lower ring flank in the direction of the crankcase. Today, this gas flow is mainly caused, by the flank roughness and waviness both of the piston ring flank and the piston groove flank at the contact areas. In addition, depending on the temperature influence, a deformation of the piston groove may occur, which likewise has a negative effect on the sealing.

Hitherto, it is known to design compression rings symmetrically or spherically symmetrically with one maximum contact point on the running surface in each case. The piston ring groove flanks and the piston ring flanks are in this case manufactured with a defined roughness, in order to give the piston rings a defined movability in the circumferential direction. Usually, the waviness of the piston ring groove and the piston ring itself is not considered.

SUMMARY

The present invention relates to a compression piston ring having a running-surface region, which has a profiled section with two apexes, which lie below a centre of a height of the piston ring.

The compression piston ring has a running-surface region, an upper flank, a lower flank and also an inner circumferential surface. The running-surface region is provided with a profiled section, which, as viewed over the axial height of the running-surface region, has in each case an upper apex and a lower apex, which are spaced from one another and are of convex spherical construction. The upper section has the upper apex and the lower section has the lower apex. A groove with a groove depth is arranged between apexes. Both apexes are arranged below a centre (according to a height) of the piston ring in the axial direction.

The term "upper" is here used in the sense of "in the direction of the combustion chamber" or "in the direction of the piston head". The term "lower" is here used in the sense of "in the direction of the crankcase" or "in the direction of the piston skirt".

This is a compression ring, which has more than one maximum contact point or more than one contact line on the running surface. In addition, these are all attached below the centre of the axial height. Here, the oil-stripping action is increased considerably during the downstroke, without changing the overflow capability or the floating on the oil film in the upstroke. Both so-called pivot points or apexes lie on an enveloping curve and are described such that in the case of two pivot points, both points are elements of the whole running-surface line and describe the highest point on the line exactly. As a result, the hydrodynamics and thus the floating of the piston ring are reduced in the downstroke, which inevitably leads to an increased stripping action in the downstroke. Due to the crowning line above the upper apex, hydrodynamics identical to a conventional compression ring can be achieved in the upstroke.

In an exemplary embodiment of the piston ring, the upper apex is arranged in a range of 22% to 45%, preferably 25% to 40% and further preferably 30% to 35% of the total height of the piston ring. Furthermore, the lower apex can be arranged in a range of 0% to 20%, preferably 5% to 18% and further preferably 10% to 15% of the total height of the piston ring.

In an additional exemplary embodiment of the piston ring, an upper outer edge of the piston ring has a larger upper depth compared to the upper apex than the lower depth of the lower outer edge compared to the lower apex. This corresponds to a longer, shallower rise on the part of the running surface, which extends from the upper apex to the upper edge of the piston ring than in the region, which extends from the lower apex to the lower edge.

In a further embodiment, the piston ring comprises a third, central convexly spherical section, with an apex, which is arranged between the upper apex and the lower apex. The central apex has a larger radial extent than the upper apex and/or the lower apex.

In an additional implementation of the piston ring, an angle between an axial direction of the piston ring and a line between the upper apex and the central apex is equal to an angle between the axial direction of the piston ring and a line between the central apex and the lower apex. Essentially, the contact lines span identical conical and mirror-symmetrical surfaces. If the piston ring tilts in the piston ring groove, two contact lines are always still available in each case for stripping oil. In this implementation, it is assumed that the ring tilts to the same extent in each case both in the upwards movement and in the downwards movement.

If the piston ring then tilts in the piston ring groove, two contact lines are always still available in each case for stripping oil. In this implementation, it is assumed that the ring tilts to the same extent in each case both in the upwards movement and in the downwards movement.

In an additional implementation of the piston ring, there is an axial direction of the piston ring parallel to a line between the upper apex and the central apex and in addition, an angle is present between the axial direction of the piston ring and a line between the central apex and the lower apex. Essentially, the upper two contact lines span a cylindrical surface. The lower two contact lines span a conical surface. If the piston moves downwards in one working cycle, the combustion gases press the piston ring against the lower piston ring groove, so that the piston ring bears flat against the lower piston ring groove and thus the central and the upper apexes (or the contact line) are in contact with the inner cylinder surface. However, if the piston moves downwards during the intake cycle, new air is sucked into the cylinder and the piston ring bears against the upper flank or the piston ring groove and tilts or twists positively, so that it bears slightly obliquely against the lower piston ring groove. In this position, the central and the lower apex (or the respective contact line) may be in contact with the inner cylinder surface.

If the piston ring tilts in the piston ring groove, two contact lines are always still available in each case for stripping oil. In this implementation, it is assumed that the ring tilts or twists differently in each case during the downwards movement of the working cycle than in the intake cycle.

In a further embodiment of the piston ring, the contour of the sections between the upper apex and the central apex is in each case equal to the contour between the central apex and the lower apex. The respective contours can in this case be tilted with respect to one another, as the three apexes So, Sm and Su do not necessarily lie on one line. By means of this implementation, the same hydrodynamic effects can be used, between the apexes So and Sm on the one hand and Sm and Su on the other hand, in the respective groove between the apexes. A first upper groove No is located between the apexes So and Sm and a second lower groove Nu is located between the apexes Sm and Su.

In another embodiment of the piston ring, the running-surface region is provided with an anti-wear layer, such as diamond-like carbon (DLC), at least in the region of the apexes. The apexes or contact lines form only a small part of the vertical extent, of the piston ring, consequently high contact pressures and increased wear are to be expected here. The fine structures of the apexes would be ablated quickly without a suitable anti-wear layer and the piston ring would be transformed into a conventional spherical compression ring.

In a further implementation of the piston ring, the spherical sections are arranged asymmetrically with respect to one another, with respect to the axial height of the running-surface region. As a result, as in conventional asymmetrically shaped spherical compression rings, the stripping action of the piston ring can be improved.

In another implementation of the piston ring, the upper depth (To) is between 20 and 40 µm, the depth of the groove (Tn) is between 1 and 5 µm and the lower depth (Tu) is between 5 and 20 µm. In the version with three apexes So, Sm and Su, the grooves between the apexes or lines So and Sm on the one hand and Sm and Su on the other hand have the same dimensions in each case.

In another exemplary implementation of the piston ring, the upper and the lower apex (So, Su) lie, with an installed ring without further loading, in each case in the same radial plane or on the same cylinder surface. In another exemplary implementation of the piston ring, the upper and the central apex (So, Su) lie, with an installed ring without further loading, in each case in the same radial plane or on the same cylinder surface.

THE DRAWINGS

In the following, the present invention is explained in more detail on the basis of schematic figures of individual exemplary embodiments.

DETAILED DESCRIPTION

Figure 1:
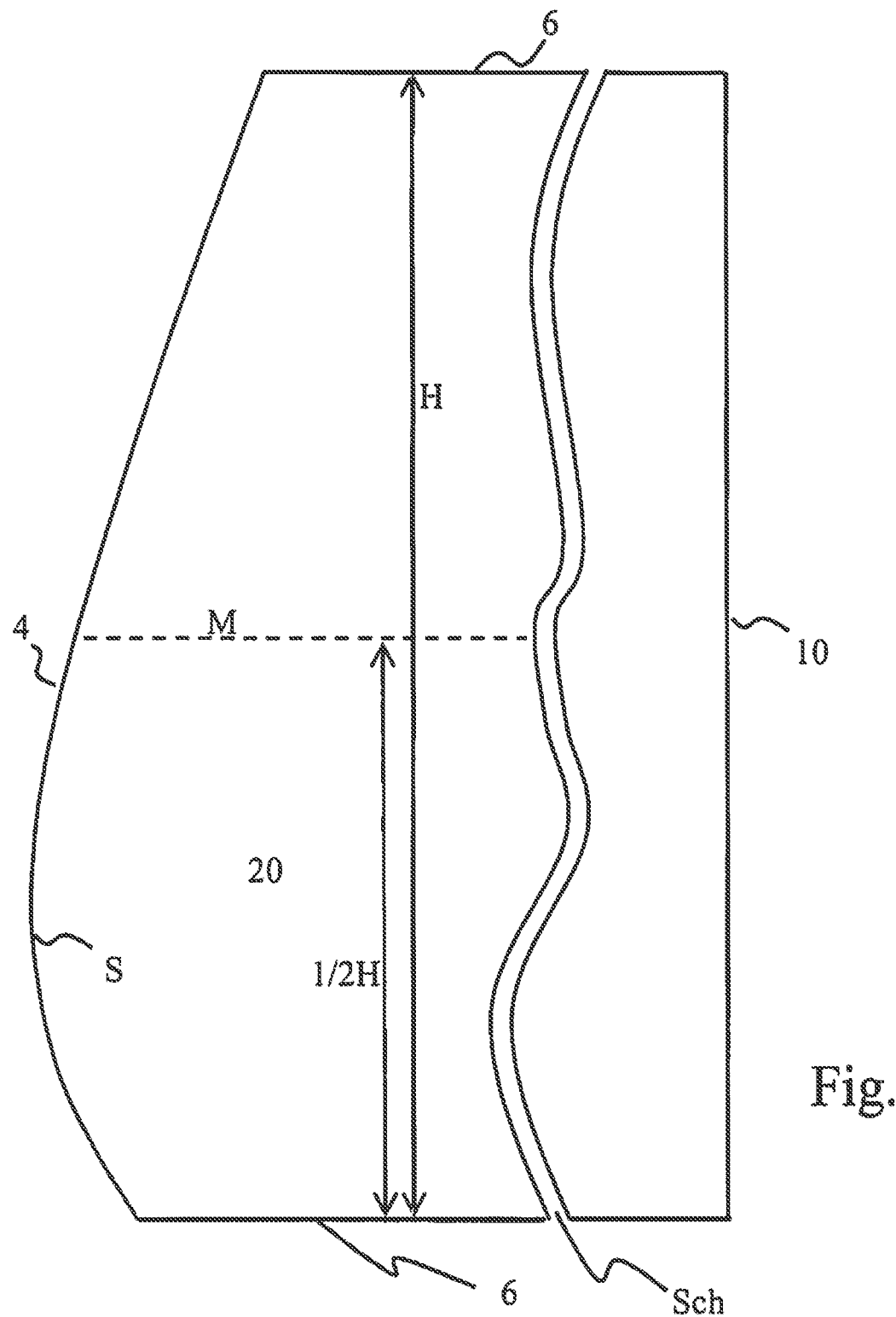
FIG. 1 illustrates a radial sectional view of a conventional compression piston ring.

In the following, both in the description and in the drawing, the same reference numbers are used in order to make reference to the same or similar elements and components.

FIG. 1 illustrates a radial sectional view of a conventional compression piston ring 20. The conventional compression piston ring 20 has a running-surface region 4, an upper flank 6, a lower flank 8 and an inner circumferential surface 10. The conventional compression piston ring 20 has a spherically shaped running-surface region 4, which comprises an apex S, wherein the running-surface region 4 is arranged, with reference to a centre M, at half of the height (½H) of the height H of the conventional compression piston ring 20. The running surface of the conventional compression piston ring 20 is implemented asymmetrically, wherein the piston ring can float on an oil film, which is present, during an upwards movement, but can strip oil from an inner cylinder wall (not illustrated) during a downwards movement. The sectional view is cut open in the radial direction, in order to be able to illustrate the profile of the running surface as clearly as possible, without being limited by the dimension of the conventional compression piston ring 20, which is larger in the radial direction.

Figure 2:
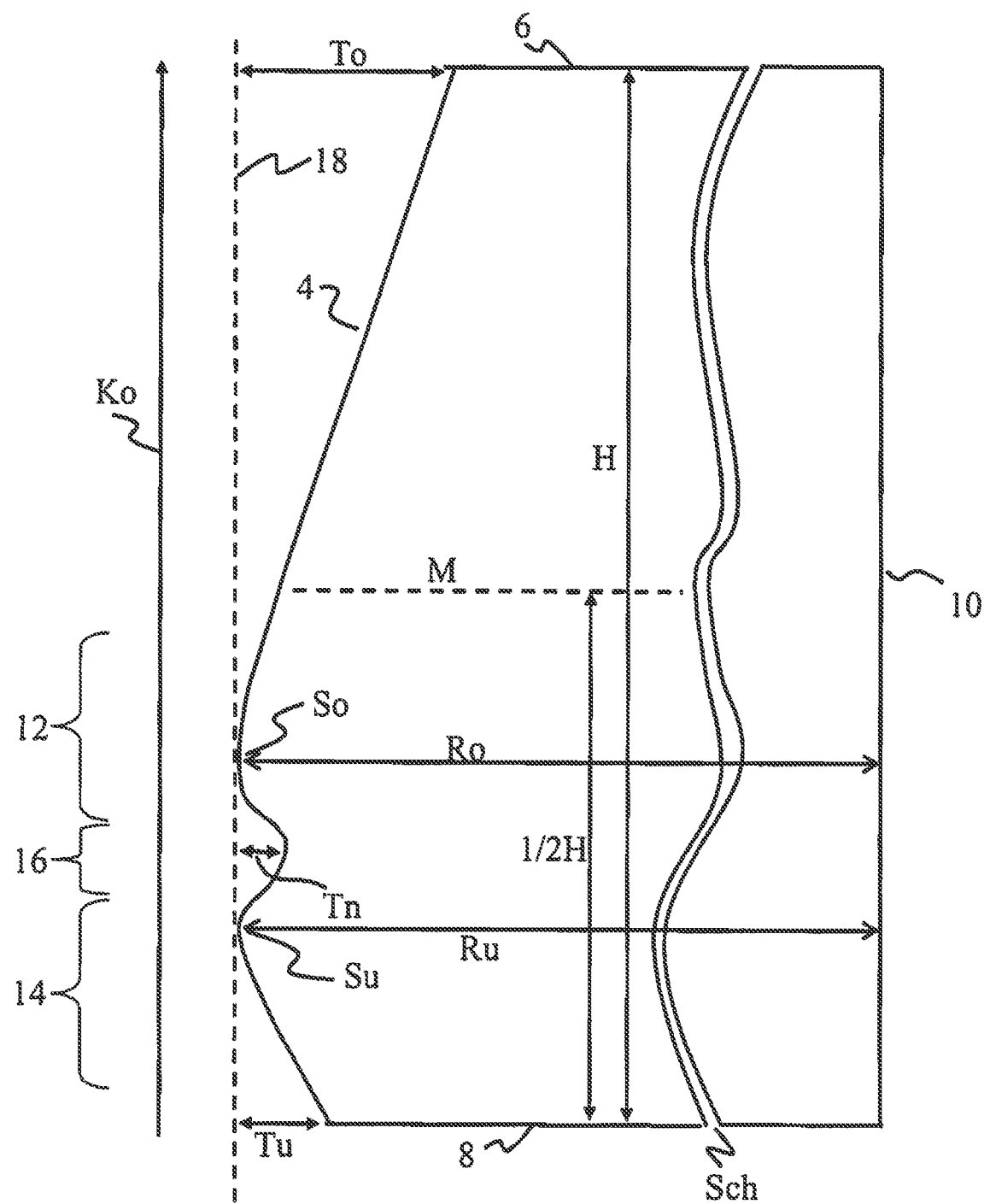
FIG. 2 illustrates a sectional view of a first implementation of a piston ring according to the invention.

FIG. 2 illustrates a sectional view of a first implementation of a piston ring 2 according to the invention. The piston ring 2 according to the invention likewise has a running-surface region 4, an upper flank 6, a lower flank 8 and an inner circumferential surface 10. The compression piston ring 2 according to the invention has a spherically shaped running-surface region 4, on which an upper apex So and a lower apex Su are arranged, which are separated from one another by a notch, which forms a groove 16. The upper apex So is arranged in an upper running-surface section 12 and the lower apex Su is arranged in a lower running-surface section 14. Both apexes So and Su are arranged below a centre M at half of the height ½H of the total height H of the compression piston ring 2. Instead of only one apex S, an upper apex So and a lower apex Su are provided, which are separated from one another by means of the groove 16. The groove 16 forms an oil retention reservoir, which improves the lubrication and the stripping action of the piston ring 2. As in the conventional compression piston ring 20 of FIG. 1, the running-surface region 4 has an asymmetrical shape.

The two apexes So and Su lie, in the case of an installed and otherwise unloaded piston ring, on a cylinder surface or on the inner cylinder surface.

The upper edge has a depth To compared to the respectively highest apex So or Su, which is larger than the depth Tu of the lower edge of the running-surface region in each case. Due to this asymmetrical shape, the piston ring can, as in the case of the conventional piston ring 20 of FIG. 1, float on an oil film, which is present, during an upwards movement and strip oil from an inner cylinder wall 18 during a downwards movement. The depth Tn of the groove 16 between the apexes So and Su is smaller than To and Tu. The two apexes So and Su have the same radial dimension in the installed state of the piston ring 2, so that they form contact lines on the inside of the inner cylinder surface 18 in each case. Also, in FIG. 2, the side view is cut open in the radial direction along the section line and illustrated shortened, in order to therefore be able to illustrate the profile of the running surface more clearly. In FIG. 2, it is assumed that the piston ring 2 bears flat with the piston ring flanks 6, 8 either against the upper or against the lower piston ring groove flank and does not tilt in the piston ring groove.

The compression ring has more than one maximum contact point or more than one contact line on the running surface. These are additionally all arranged below the centre M of the axial height. Both so-called pivot points or apexes So and Su lie on an enveloping curve and are described such that in the case of two pivot points, both points are elements of the whole running-surface line and describe the highest point on the line exactly, both therefore lie on a cylinder surface. As a result, the hydrodynamics and thus the floating of the piston ring are reduced in the downstroke, which inevitably leads to an increased stripping action in the downstroke or during the upstroke or compression stroke in direction Ko. Due to the crowning line above the upper apex, hydrodynamics identical to a conventional compression ring can be achieved in the upstroke.

Figure 3A:
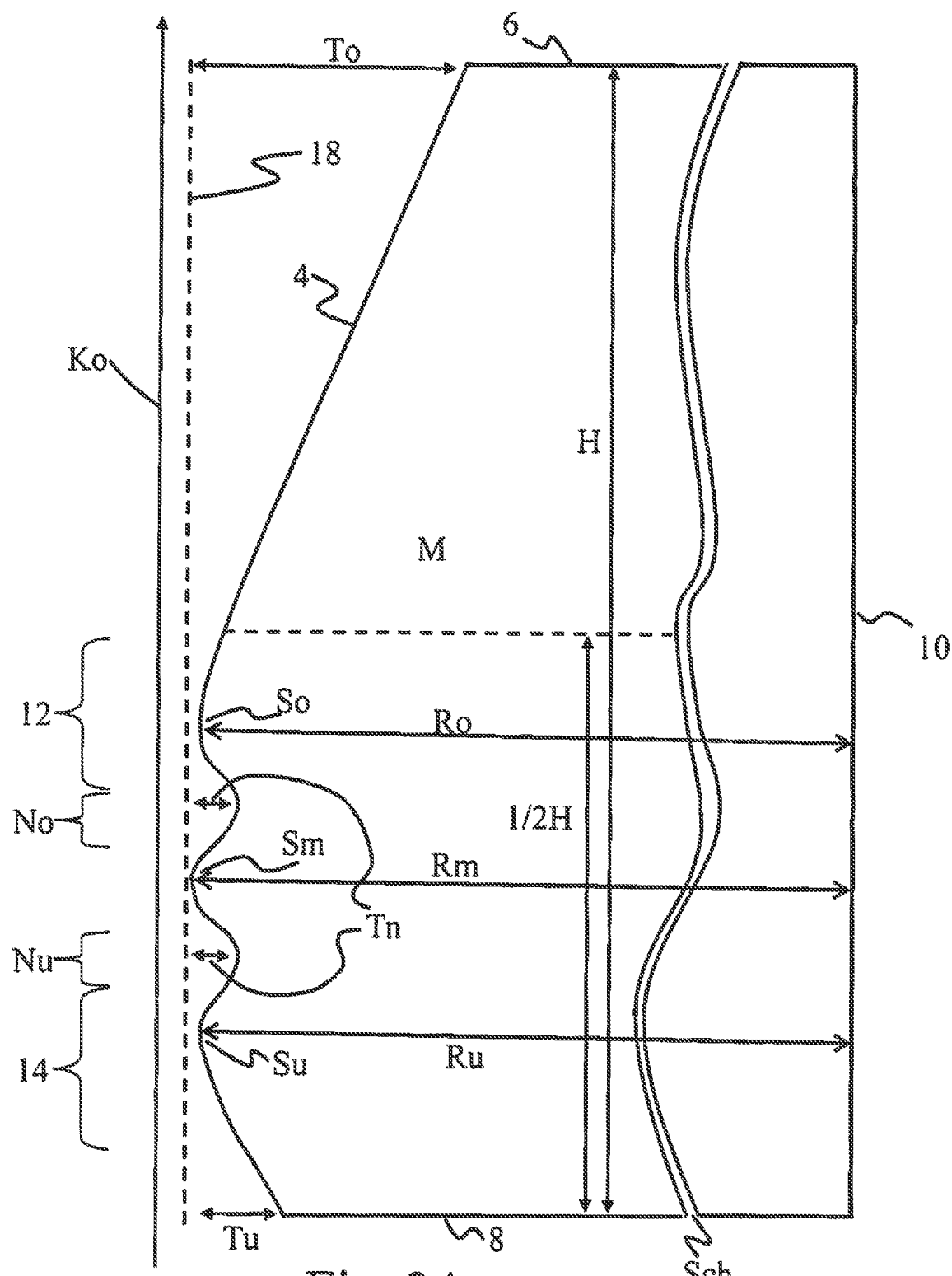
FIG. 3A shows a sectional view of a further implementation of a piston ring according to the invention.

FIG. 3A illustrates a side view of a second implementation of a piston ring 2 according to the invention. The basic structure corresponds to the implementation of FIG. 2 and is not repeated here in full detail. A further central apex Sm is arranged in the groove 16 of FIG. 2. The groove 16 is divided into an upper groove No and a lower groove Nu. The central apex has a larger radial dimension Rm than the same dimensions Ro and Ru of the upper and the lower apexes So and Su respectively. In FIG. 3A, Rm>Ro, Rm>Ru and Ro=Ru, wherein the signs > and = in the field of production and measurement precision should apply. This implementation assumes that the piston ring tilts easily and evenly inside the piston ring groove of a piston both during an upwards movement Ko and during a downwards movement.

Figure 3B:
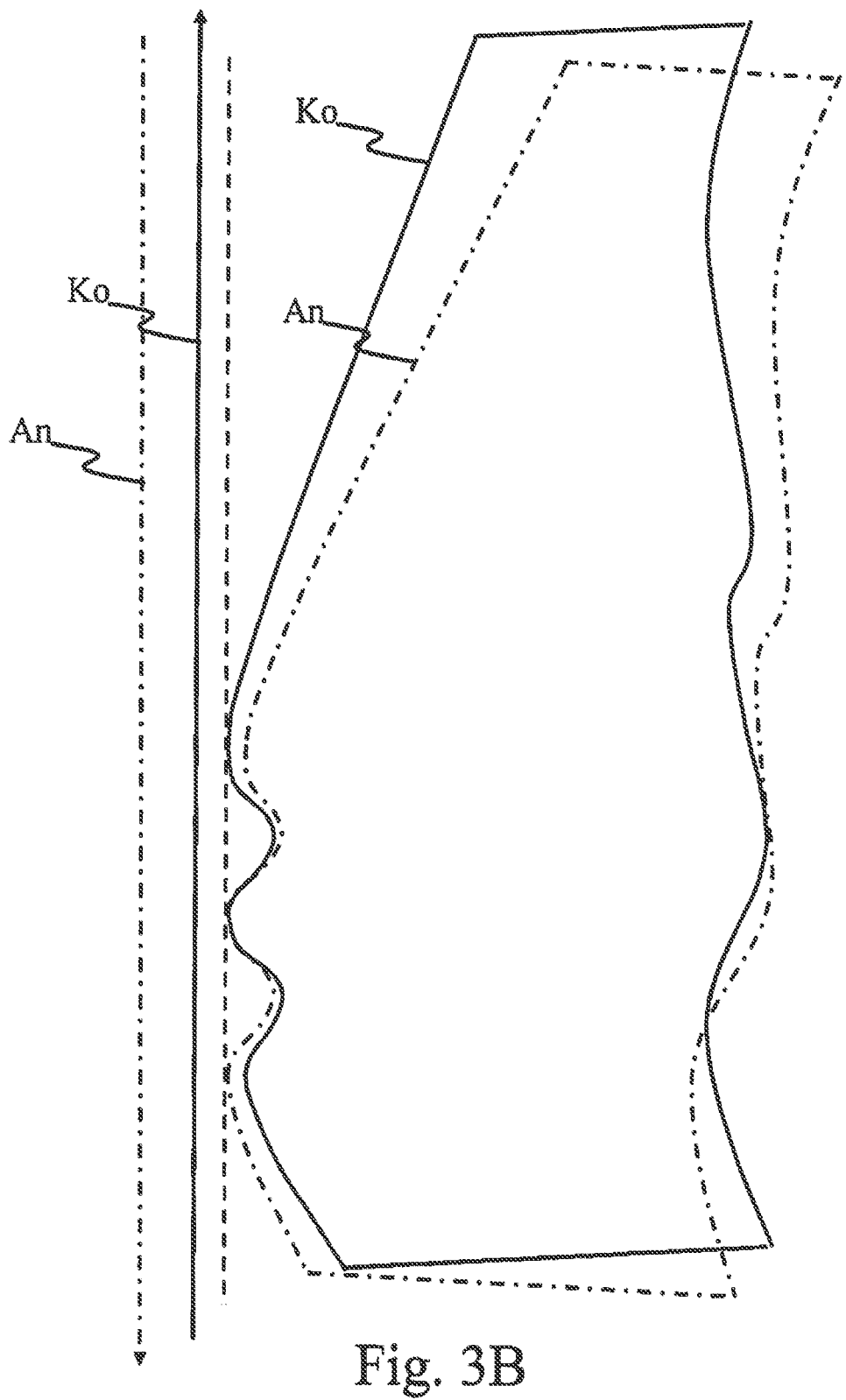
FIG. 3B shows a sectional view of the piston ring of FIG. 3A under loading.

The action of the structure of the piston ring 2 of FIG. 3A is clarified by FIG. 3B. The piston ring tilts easily in the piston ring groove, both during an upwards movement Ko and during a downwards or intake movement. During the upwards movement Ko, the piston ring 2 bears in a negatively twisted manner, with the upper apex So and the central apex Sm of the profile, against the inner cylinder wall, as is illustrated by the solid line. By contrast, the dot-dashed line An shows the compression ring in a slightly positively twisted position, which is expected during an intake cycle or an upwards movement of the piston. In this form, both during an upwards movement and during a downwards movement, there are always two contact lines with the cylinder wall available for sealing the gases out of the combustion chamber.

Figure 4A:
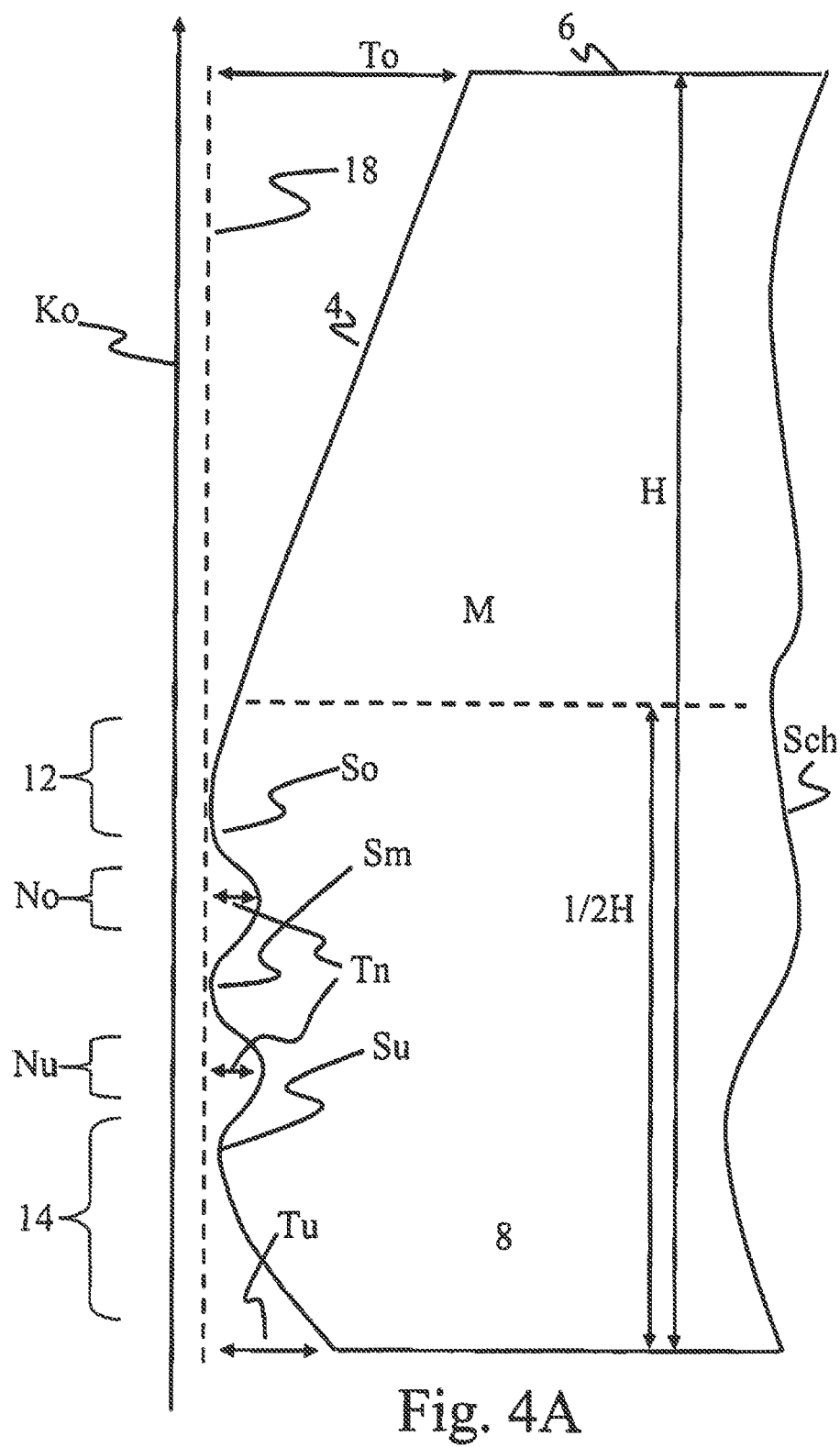
FIG. 4A shows a sectional view of an additional implementation of a piston ring according to the invention.

FIG. 4A illustrates a side view of a second implementation of a piston ring 2 according to the invention. The basic structure corresponds to the implementation of FIG. 3A. Only the radial dimensions Ro, Rm and Ru are distributed differently. The central apex Sm and the upper apex Su in each case have the radial dimensions Ro and Rm, which are equal. The lower apex Su has a radial dimension Ru, which is smaller than the radial dimensions Ro and Rm of the upper and the central apex So and Sm. In FIG. 4A, Ro>Ru, Rm>Ru and Ro=Rm, wherein the signs > and = in the field of production and measurement precision should apply.

This implementation is designed to achieve a maximum stripping action during a downwards movement of the piston in each case. The piston ring strips oil from the inner cylinder wall 18 both during a downwards movement in an intake cycle (An) and during a downwards movement in a working cycle (Ar). In this case it is assumed that, during the working cycle Ar, inside the piston ring groove, the piston ring 2 bears with the lower piston ring flank 8 flat against the lower piston ring groove flank, and tilts easily and evenly during an intake cycle of the piston.

Figure 4B:
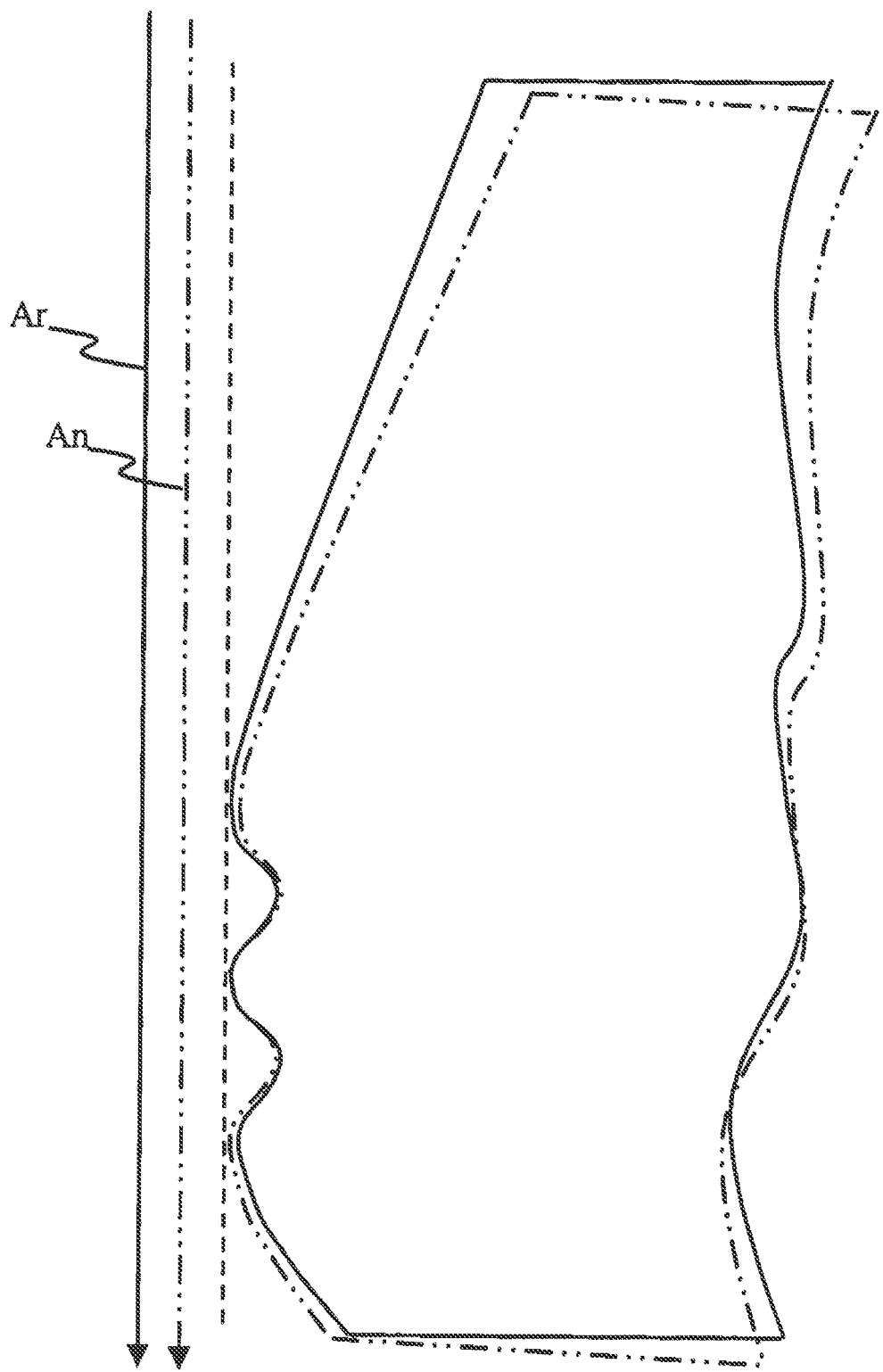
FIG. 4B shows a sectional view of the piston ring of FIG. 4A under loading.

The action of the structure of the piston ring 2 of FIG. 4A is clarified by FIG. 4B. Owing to the different pressure conditions, the piston ring tilts in a slightly positively twisted manner in the piston ring groove only during a downwards movement of the intake cycle An. By contrast, during the downwards movement of the piston during the working cycle Ar, the excess pressure of the combustion gases presses the piston ring with the lower piston ring flank flat against the lower piston ring groove flank.

During the downwards movement An of the intake cycle, the piston ring 2 bears in a slightly positively twisted manner, with the central apex Sm and the lower apex Su of the profile, against the inner cylinder wall, as is illustrated by the dot-dashed lines. By contrast, the solid line Ar shows the compression ring flat and untwisted, during a downwards movement of the piston during the working cycle. With this form of the profile of the piston ring, both during a downwards movement of the intake cycle An and during a downwards movement of the working cycle, there are always two contact lines with the cylinder wall available for sealing the gases out of the combustion chamber and for stripping oil from the inner cylinder wall (here illustrated dashed).

The compression ring always has more than one maximum contact point or more than one contact line on the running surface, even if the ring twists. These contact lines are all arranged below the centre M of the axial height of the piston ring. The piston ring is shaped spherically in each case in the region of the apexes So, Sm and Su and an upper groove Nu and a lower groove Nu are formed between the apexes So, Sm and Su in each case. The grooves No and Nu are preferably provided with an identical shape or profiled section. Further preferably, the grooves No and Nu have an asymmetrical shape or profiled section, which further amplifies the effect of the asymmetrical compression ring with respect to the stripping action. In particular, it is provided to configure the upper flank of the groove more steeply and the lower flank of the groove in a more shallow manner. As a result, the hydrodynamics and thus the floating of the piston ring are reduced in the downstroke, which inevitably leads to a more increased stripping action in the downstroke than during the upstroke.

So as not to overload the description, no attempt was made to individually list all combinations of piston rings, which are covered by the claims. These combinations, which result from combinations of the features of the embodiments, should likewise be considered as disclosed.

The invention claimed is:

1. A compression piston ring having a running-surface region, an upper flank, a lower flank and also an inner circumferential surface, wherein the running-surface region is provided with a profiled section, which, as viewed over the axial height of the running-surface region, comprises mutually spaced, convexly spherically constructed sections having an upper and lower apex, wherein the upper apex is arranged in a range of 30% to 35% of the total height of the piston ring, and the lower apex is arranged in a range of 10% to 15% of the total height of the piston ring, wherein a groove with a depth is arranged between the apexes, wherein both apexes are arranged below a center of the piston ring in the axial direction, wherein the spherical sections are arranged asymmetrically with respect to one another, with respect to the axial height of the running-surface region.

2. The piston ring according to claim 1, wherein an upper outer edge of the piston ring has a larger upper depth compared to the upper apex than a lower depth of the lower outer edge compared to the lower apex.

3. The piston ring according to claim 1, further having a third, central convexly spherical section with an apex, which is arranged between the upper apex and the lower apex, wherein the central apex has a larger radial extent than the upper apex and/or the lower apex.

4. The piston ring according to claim 3, wherein an angle of an axial direction of the piston ring and a line between the upper apex and the central apex is equal to an angle between an axial direction of the piston ring and a line between the central apex and the lower apex.

5. The piston ring according to claim 3, wherein a line between the upper apex and the central apex is parallel to an axial direction of the piston ring and the angle between an axial direction of the piston ring and a line between the central apex and the lower apex is between 1 and 6 angular minutes.

6. The piston ring according to claim 3, wherein the contour of the sections between the upper apex and the central apex is in each case equal to the contour between the central apex and the lower apex.

7. The piston ring according to claim 1, wherein the running-surface region is provided with an anti-wear layer at least in the region of the apexes.

8. The piston ring according to claim 7, wherein the anti-wear layer comprises diamond-like carbon.

9. The piston ring according to claim 1, wherein the upper depth is between 20 and 40 µm, the depth of the groove is between 1 and 5 µm and the lower depth is between 5 and 20 µm.

10. The piston ring according to claim 1, wherein the lower and the upper apexes lie in the same radial plane in each case, or the upper and the central apexes lie in the same radial plane in each case.

* * * * *